Jan. 12, 1937.　　　J. J. MUELLER　　　2,067,781
CULTIVATOR
Filed Dec. 20, 1935　　　2 Sheets-Sheet 1
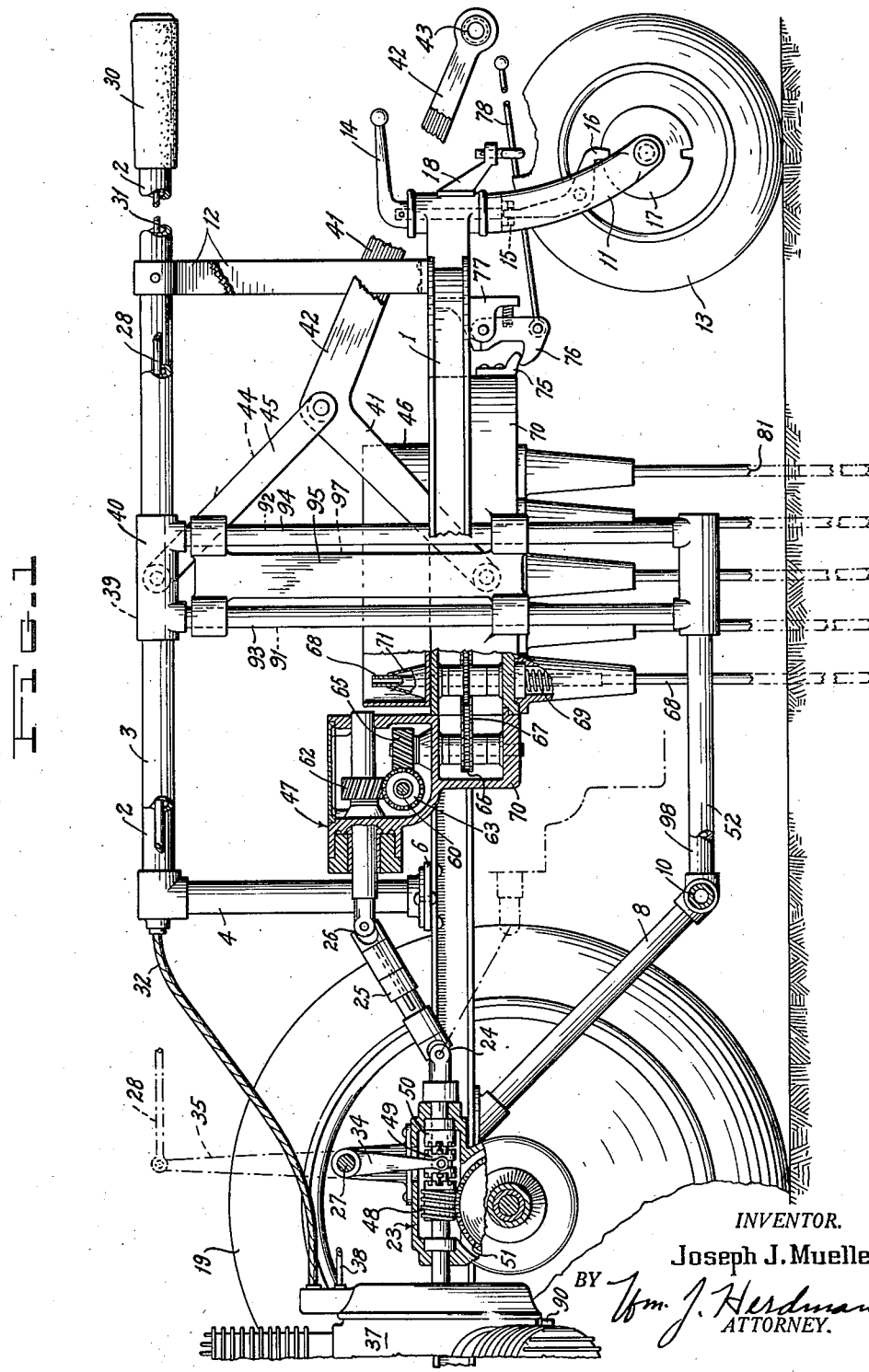
INVENTOR.
Joseph J. Mueller
BY Wm. J. Herdman
ATTORNEY.

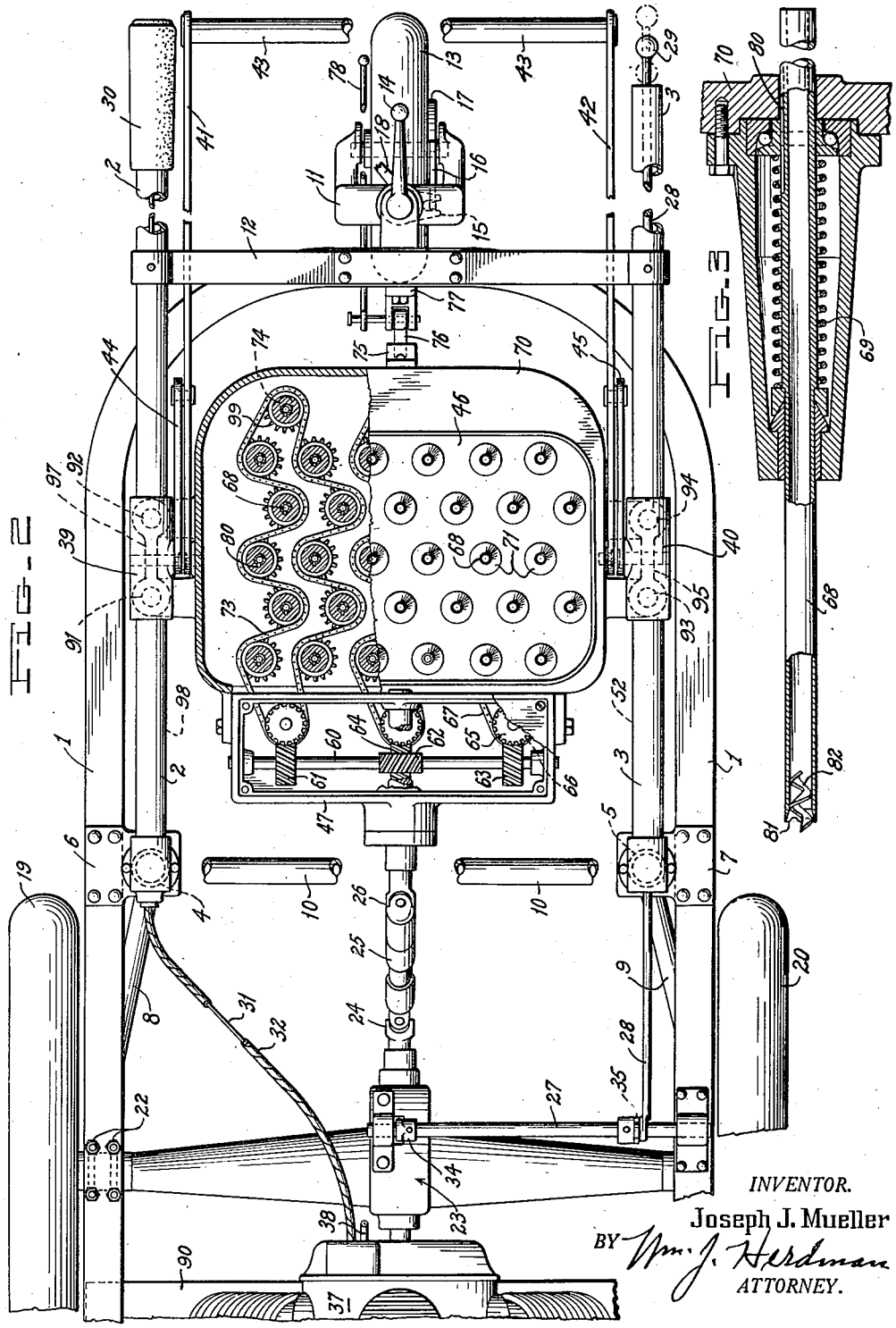

Patented Jan. 12, 1937

2,067,781

UNITED STATES PATENT OFFICE 2,067,781

CULTIVATOR

Joseph J. Mueller, West Orange, N. J., assignor of one-half to Harry W. Morgan, Maplewood, N. J.

Application December 20, 1935, Serial No. 55,397

6 Claims. (Cl. 97—43)

My invention pertains to implements for improving the condition of soils, such as are broadly termed cultivators, and relates particularly to a novel form of cultivator which while especially adapted to improve the draining, aerating and irrigating of sodded areas, is equally useful in other types of soil cultivation such as seeding, fertilizing, and pest extermination.

Sodded areas require frequent deep cultivation to increase the porosity of the soil, to afford proper draining, to permit access of moisture to the grass roots, to permit fertilizers to be applied near the grass roots, and to aerate the soil in order to ensure the preservation of the sod. Such cultivation is especially necessary in the greens and even fairways of golf courses where the frequent rolling and continual tramping by the feet of the players unduly compresses the soil impeding drainage, irrigation and aeration.

Hitherto such cultivation of sodded areas has been accomplished by "forking", that is, the tines of multitined forks have been driven manually or by power devices into the soil. Such methods are unsatisfactory because the tines of the fork travel through the soil in an arc or at a sharp angle, thus leaving ridges in the surface of the area near where the tines enter and leave and burrs or rings around the apertures rendering the surface of the area uneven, a positive detriment in golf greens and the like. Further, as the tines of the fork sharply compress the earth throughout the inner surfaces of and the areas surrounding the apertures they make, the porosity of the apertures is decreased, thus largely defeating the purpose of the apertures to increase drainage, irrigation and aeration. If the tines are driven deep enough to be really effective the sod is torn and large areas displaced when the fork is withdrawn.

An object of my invention comprises producing an implement for soil culture which may be used to effectively improve the condition of sodded areas with minimum disturbance to the surface thereof.

Another object comprises producing a cultivator whereby deep cultivation may be accomplished without soil impaction to increase the porosity of the soil, to afford effective irrigation, aeration and drainage without disturbance of the surface level of the sod.

Still another object of my invention comprises producing a cultivator for sodded areas whereby the condition of such areas may be easily and quickly improved.

A still further object comprises producing a cultivator for sodded areas for deeply increasing the porosity of the soil to afford effective drainage, irrigation, aeration, fertilization and pest elimination.

I accomplish all of the above noted desirable results by means of the novel combination, interrelation and arrangement of parts which will be hereinafter more specifically described with reference to the accompanying drawings forming a part of this specification and in which like numerals designate corresponding parts throughout.

In the accompanying drawings:

Fig. 1 is a partially broken, partially sectioned elevation of an embodiment of my invention;

Fig. 2 is a partially broken, partially sectioned plan view of the same; and

Fig. 3 is a partially sectioned view of one of the cultivator elements employed in my invention.

Referring now to the drawings which illustrate, by way of example, an embodiment of my invention especially adapted for the effective cultivation of golf greens and the like, and especially to Figs. 1 and 2, a wheeled carriage adapted to traverse a terrain is composed of a main supporting member 1 which may be made of a mild steel I-beam formed into a substantially U-shape. To this member there is attached by means of columns 4 and 5 secured to the member 1 by means of plates 6 and 7, respectively, handles 2 and 3, respectively. Preferably the columns 4 and 5 and the handles 2 and 3 are composed of steel tubing. The handles 2 and 3 are further reinforced in their attachment to the member 1 by means of yoke member 12 which is attached to both of the handles and the main supporting frame 1, as shown. A fork 11 serves to rotatably support a follow wheel 13 and the fork is pivoted in a journal attached as shown to frame member 1. A notched disk 17 is attached to wheel 13 and moves therewith. A dog 16 is adapted to engage with notches in the disk 17. The position of the dog 16 is controlled manually by handle 14 through finger member 15. This motion limiting device will be referred to at length hereinafter.

A pair of driving wheels 19 and 29 are connected by means of a differential drive 23 and attached to the main frame member 1 by bolts as 22. A pair of vertical guides 91 and 92 are supported by member 39 and handle 2, while a similar pair of vertical guides 93 and 94 are supported by member 40 and handle 3. The lower ends of these guides are supported by additional metal frame work, preferably tubular in cross-section, consisting of strut members 8 and 9 and cross bar member 10, attached to the main frame member 1 and depending from the lower side thereof. This additional frame work serves to support the guide members 91, 92, and 93, 94, by means of tubular struts 98 and 52, respectively. A source of power, which may be an air-cooled gas engine 37, is mounted on the main frame member 1 by means of the supporting member 96 and the shaft of the engine is connected as shown through spiral gear 48 with the gear 51 of differential 23. A clutch member 50 is attached to the shaft of the flexible coupling 24 and through slip-coupling 25 and flexible coupling 26, with a spiral gear 62 carried in a gear box 47. Gear box 47 is attached to a multiple drill housing 70. The spiral gear 62 meshes with spiral gear 64 attached to shaft 60 to which are also attached spiral gears 61 and 63. Spiral gears 61, 64 and 63 mesh with three similar spiral gears, one of which, 65, is shown in Fig. 1. These gears rotate sprocket wheels as 66 carrying chains as 67 and 73 engaging with other sprocket wheels splined to each of the drills as 68 carried by drill housing 70. It will be noticed that the chains engage adjacent sprocket wheels in reverse manner in order that adjacent drills rotated by the sprocket wheels may operate in reverse direction, which will hereinafter be explained. Additional sprocket wheels as 99 are provided for the chains as 67 and 73 and the shafts of these are provided with well known cam adjustments as 74, whereby the slack of the chains may be taken up.

It will be obvious from the foregoing that each of the foregoing spiral gears 61, 63, and 64, driven from the motor 37 through the clutch member 50, universal couplings 24 and 26 and slip-coupling 25, spiral gears 62 and shaft 60, operate three groups of chains as 67 and 73, each operating a group of ten drills or a total of thirty drills carried in the drill housing 70. The drill housing 70 carries a pair of guides 97 and 95 provided with drilled bosses to slide on the guide rods 91, 92, and 93, 94, respectively, whereby the drill housing 70, gear box 47 and the drills as a unit may be raised or lowered with respect to the wheeled carriage. The universal couplings 24 and 26 and slip-coupling 25 permit rotating the drills during such movement. The drill housing and drills may be lowered or raised by means of bell cranks 41 and 42 and handle bar 43 cooperating with the links 44 and 45. The links 44 and 45 are pivoted to the handle bar supporting members 39 and 40, and the bell cranks 41 and 42 respectively, while bell cranks 41 and 42 are pivoted to the guide members 97 and 95, respectively attached to the drill housing 70. As the handle 43 is depressed the drill housing is raised and when the handle 43 is raised the drill housing is lowered to the position shown in dotted lines in Fig. 1.

The power from the engine 37 may be utilized to drive the carriage over a terrain by means of the clutch member 49. This clutch member is splined to the shaft and rotates therewith and when the clutch member is by means of the levers 34, 35, shaft 27 and rod 28 carried in handle 3 and provided with knob 29, moved to force the clutch member 49 into engagement with the worm 48, power from the engine 37 is transmitted through differential gear 51 to wheels 19 and 20 to move the carriage over a terrain. Ordinarily the carriage is moved and guided manually by means of the handles 2 and 3 but in order that the carriage may be moved from one location to another, the power of the engine is transmitted to driving wheels 19 and 20 as just described. When it is desired to rotate drills in the housing 70 the clutch member 49 is moved by handle 29, rod 28, levers 34 and 35 and shaft 27 to engage the clutch member 50 attached to the shaft carrying the flexible coupling 24. In this position all of the drills are rotated and may be lowered to perform the desired cultivation.

The penetration of the drills is usually about six inches, as this has been found to be most effective for proper cultivation of golf greens and the like. After the drills have penetrated the desired depth, they are raised by depressing handle bar 43 and the lever 14 is moved to remove the dog 16 from the notch in disk 17 to permit the carriage to move the extent of half a revolution of wheel 13. Thereafter the handle 14 is moved to engage the dog 16 with the notch in disk 17 to limit further motion. The diameter of wheel 13 is such that successive groups of perforations by the drills will be spaced from preceding groups by a distance equal to the distance between adjacent drills as spaced in the housing 70. Thus uniform perforation of the area being cultivated is achieved.

In order to latch the drill housing 70 and drills in an inoperative position, there is provided a pivot support 77 attached to frame member 1 carrying a latch 76 which engages with detent 75 attached to drill housing 70. Spring pressure keeps the latch 76 in engagement with detent 75. It is withdrawn from such engagement by means of the lever 78 carried in support 18 as shown.

The drills as 68 are preferably made of steel tubing and are mounted as shown in Fig. 3 in a housing attached by screws to the drill housing 70. The drills are carried by two journals, one at the lower extremity, a self-oiling bearing, and the other at the upper extremity, a ball-bearing as shown. Further, there is provided a spring 69 and spline 80, through which the drill is rotated by its associated sprocket wheel, whereby should the drill in penetrating the soil impinge upon a rock the drill while rotating may rise against the pressure of spring 69 while the other drills not so impeded continue their perforation.

Each of the drills is provided with a helical internal vane 82, the outer lip of which is sharpened which serves as an excavator for conveying the soil from the drill hole into the hopper 46 carried on the drill housing 70. This hopper is provided with conical aperture shields as 71 surrounding the hollow drills as 68 for the purpose of preventing the soil from entering the drill bearings. The drills, as 68, are provided with sharpened and serrated edges 81 to provide a saw action to permit the drills to make clean cuts through soil, grass, weed roots, etc., and to prevent impaction of the internal surfaces of the apertures made by the drills in order to facilitate drainage and access of air to the sod roots. The speed of the engine 37 is controlled by means of handle 30 through flexible coupling 32 and 31. The gas tank is omitted for purposes of clarity, although the inlet 38 from the gas tank to the carbureter is shown.

It will be obvious from the foregoing that my device may be caused to traverse a terrain either by means of the handles 2 and 3 or by means of engine 37. It will be obvious also that the rotation of the drills, the movement of the carriage over a terrain, the raising and lowering of the drills as a unit and the limit of motion of the carriage over a terrain are all controlled by means located near the guiding handles 2 and 3. In operating my device, preferably the power of the engine 37 is used to transport the device to the location in which it is desired to be used. Thereafter the engine is disconnected from the driving wheels and used for the purpose of rotating the drills. The drills are gradually lowered into the sod while rotating and are withdrawn from the sod also while rotating.

I have discovered that if the drills are withdrawn from the sod while rotating and especially while adjacent drills are rotating in opposite directions, a minimum disturbance to the surface of the sod is caused and no burrs or ridges are formed. Obviously the excavators as 82 must be either right or left hand helices depending upon the direction of rotation of the drills in which they are used. The excavators lift the soil from the apertures made by the drills into the hopper 46 which may be removed and the contents thereof disposed as desired. As soon as one set of perforations has been made to the required depth the drills are raised and the carriage is manually moved one-half revolution of wheel 13 and a new set of perforations made. This is continued until the area under cultivation is completely covered, after which the power of the engine may be used to transport the wheeled carriage to any other desired location.

It will be obvious from the foregoing that my invention provides an improved implement for soil culture which may be used to effectively improve the condition of sodded areas with minimum disturbance to the surface thereof, and whereby deep cultivation may be accomplished without impaction of the soil to afford effective irrigation, aeration and drainage.

Although I have shown and described by way of example only one embodiment of my invention, it will be apparent that various changes may be made therein without departing from the intended scope and spirit of the invention. I do not, therefore, desire to limit myself to the foregoing except as may be pointed out in the appended claims, in which I claim:

1. A cultivator comprising a wheeled carriage, driving means for said carriage supported by said carriage, a plurality of hollow tubular drills each provided with serrated annular cutting edges and internal helical excavators carried by said carriage, means for raising or lowering said drills as a unit and means for utilizing said driving means for rotating said drills.

2. A cultivator comprising a wheeled carriage, driving means for said carriage supported by said carriage, a plurality of hollow tubular drills carried by said carriage, springs for each of said drills for holding each drill against the object being operated on, means for raising and lowering said drills as a unit and means for utilizing said driving means for rotating said drills.

3. A cultivator comprising, a wheeled carriage, driving means supported by said carriage and adapted to move said carriage over a terrain, said driving means being differentially connected to a pair of the wheels of said carriage, a plurality of hollow tubular drills each provided with cutting edges and internal helical excavators carried by said carriage, means for raising or lowering said drills as a unit and means for utilizing said driving means for rotating some of said drills in one direction and others in the opposite direction.

4. A cultivator comprising, a plurality of tubular excavating elements each having a smooth external surface throughout the operative length thereof, means positioning said elements with relation to each other and supporting said elements with their longitudinal axes substantially perpendicular to a terrain, means for rotating each of said elements and means for raising or lowering said positioning and supporting means with respect to said terrain.

5. A cultivator comprising, a plurality of hollow tubular drills with internal excavators, means for positioning said drills with relation to each other and supporting said drills with their longitudinal axes substantially perpendicular to a terrain, means for rotating each of said drills and means for raising or lowering said positioning and supporting means with respect to said terrain.

6. A cultivator comprising, a plurality of drills each having a smooth external surface throughout the operative length thereof, means positioning said drills with relation to each other and supporting said drills with their longitudinal axes substantially perpendicular to a terrain, means for rotating each of said drills and means for raising or lowering said positioning and supporting means with respect to said terrain.

JOSEPH J. MUELLER.